(12) United States Patent
Mohammed et al.

(10) Patent No.: US 9,361,636 B2
(45) Date of Patent: Jun. 7, 2016

(54) CREATING, MANAGING, AND PROVISIONING PACKAGES OF ONLINE APPLICATIONS

(75) Inventors: Yunus Mohammed, Bellevue, WA (US); Apurva F Dalia, Sammamish, WA (US); Christopher Gariepy, Bothell, WA (US); Venugopala Rao Moram, Redmond, WA (US); Joydeep Bhattacharyya, Bellevue, WA (US); Sandeep P Karanth, Bangalore (IN); Christopher J Saam, Kirkland, WA (US); Lizhong Huang, Sammamish, WA (US); Rodrigo Junqueira Lode, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1523 days.

(21) Appl. No.: 12/123,468

(22) Filed: May 20, 2008

(65) Prior Publication Data

US 2009/0292545 A1 Nov. 26, 2009

(51) Int. Cl.
G06Q 30/06 (2012.01)
G06Q 10/10 (2012.01)
G06Q 30/02 (2012.01)
G06Q 10/06 (2012.01)
G06Q 10/08 (2012.01)
G06Q 30/00 (2012.01)

(52) U.S. Cl.
CPC .............. *G06Q 30/06* (2013.01); *G06Q 30/016* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 6,240,396 B1 | 5/2001 | Walker et al. | |
| 7,103,565 B1 | 9/2006 | Vaid | |
| 2006/0020525 A1 | 1/2006 | Borelli et al. | |
| 2006/0149653 A1 | 7/2006 | Davis et al. | |
| 2006/0168355 A1* | 7/2006 | Shenfield et al. | 709/250 |
| 2006/0247972 A1 | 11/2006 | Baron et al. | |
| 2007/0055616 A1 | 3/2007 | Clay et al. | |
| 2007/0073591 A1 | 3/2007 | Perry et al. | |
| 2007/0219857 A1 | 9/2007 | Seymour et al. | |
| 2007/0233578 A1 | 10/2007 | Fusz et al. | |
| 2007/0233579 A1 | 10/2007 | Saarinen et al. | |
| 2009/0070757 A1* | 3/2009 | Bak et al. | 717/177 |
| 2009/0248695 A1* | 10/2009 | Ozzie et al. | 707/10 |
| 2009/0254912 A1* | 10/2009 | Roundtree et al. | 718/102 |

OTHER PUBLICATIONS

"JSR 251: Pricing API", 1995-2007, Sun Microsystems, pp. 1-6.
"eBay API Integration & Development", 1997-2007, Intechnic Corporation, pp. 1-2.

(Continued)

*Primary Examiner* — Jonathan Ouellette
(74) *Attorney, Agent, or Firm* — Tom Wong; Micky Minhas

(57) ABSTRACT

Methods and computer-readable media are provided herein for implementing custom application programming interfaces (API) for creating, managing, and provisioning packages of online applications. An offer management service API is implemented that provides methods for creating and modifying offers for packages of online applications. An offer provisioning API is implemented that provides methods enabling the provisioning of online applications for subscribers to offers. An application provider API is published and utilized to provision and maintain individual instances of online applications provided by application providers.

20 Claims, 17 Drawing Sheets

(56) References Cited

OTHER PUBLICATIONS

"JSR 251: Pricing API", downloaded Oct. 19, 2007 from http://jcp.org/en/jsr/detail?id=251, Sun Microsystems, pp. 1-6.

"e8ay API Integration & Development", downloaded Oct. 19, 2007 from http://www.intechnic.com/solutions/product_catalogs_and_galleries/ebay_api_integration_and_development.html, Intechnic Corporation, pp. 1-2.

* cited by examiner

| IOfferProvision |
| --- |
| GetAccountTemplate(Guid offerId) : void
ProvisionAccount(Account account) : SubscriptionId
ProvisionApplication(SubscriptionId accountId, Application application) : string
ReprovisionApplication(SubscriptionId accountId, Application application) : void
DeprovisionAccount(SubscriptionId accountId) : void
DeprovisionApplication(SubscriptionId accountId, Guid applicationId,
    string applicationInstanceId) : void
DisableAccount(SubscriptionId accountId) : void
EnableAccount(SubscriptionId accountId) : void
ConvertAccount(SubscriptionId accountId, Account targetAccount) : void
GetGadgetRendering(Guid applicationId, string applicationInstanceId,
    GadgetRequest request) : GadgetResponse
GetGadgetResource(Guid applicationId, string applicationInstanceId,
    GadgetRequest request) : GadgetResource
GetPropertySummaries(SubscriptionId accountId, Guid applicationId,
    string applicationInstanceId) : ApplicationPropertySummary[]
RenameApplication(SubscriptionId accountId, Guid applicationId,
    string applicationInstanceId, string name) : void |

IApplicationProvider

ValidateProvisionApplication(ProviderApplication application) : ValidationResponse
ProvisionApplication(ProviderApplication application) : void
ValidateReprovisionApplication(ProviderApplication application) : ValidationResponse
ReprovisionApplication(ProviderApplication application) : void
DisableApplication(ProviderApplication application) : void
EnableApplication(ProviderApplication application) : void
DeleteApplication(ProviderApplication application) : void
RenameApplication(ProviderApplication application, string newName) : void
GetGadgetRenderingDetails(ProviderApplication application,
 　　　　　ApplicationProviderGadgetRequest gadgetRequest) :
 　　　　　ApplicationProviderGadgetResponse
GetGadgetResource(ProviderApplication application,
 　　　　　ApplicationProviderGadgetRequest gadgetRequest) :
 　　　　　ApplicationProviderGadgetResource
GetUsage(ProviderApplication application) :
 　　　　　ProviderApplicationUsageSummaryProperty[]

OfferConfig

AddOnOffers : List <OfferConfig>
AllowedDomainAcqurieTypes : List <int>
AuthorizedCallerApplications : List <AuthorizedCallerApplicationType>
BetaConvertOfferId : Guid
BetaEndDate : DateTime
BillingInfo : BillingConfig
BillingRequired : bool
CreatedByCallerApplicationId : int
CreatedDate : DateTime
EndDate : DateTime
GracePeriod : int
InternalAllowedDomainAcquireType : List <DomainAcquireType>
InternalOfferID : int
IsAddOn : bool
IsBeta : bool
IsDeleted : bool
IsTrial : bool
MarketingSkuInfo : MarketingSku
Markets : List <string>
MaxOwnerShip : int
ModifiedByCallerId : int
ModifiedDate : DateTime
OfferApplications : List <OfferApplicationConfig>
OfferConversationConfig : List <OfferConversationConfig>
OfferId : Guid
OfferName : string
OfferTag : long
SignupExperiencedId : Guid
StartDate : DateTime
TermsOfUsageVersion : string
TopLevelDomains : List <string>
TrialConvertOfferId : Guid
TrialPeriod : int
Version : int

*Figure 9A*

ApplicationConfig

ApplicationId : Guid
ApplicationName : string
ApplicationTag : long
BillingApplicationId : string
ConvertToApplications : List <int>
CreatedByCallerApplicationId : int
CreatedDate : DateTime
Gadgets : List <GadgetConfig>
InternalApplicationId : int
InternalApplicationTag : ApplicationTag
IsDeleted : bool
IsSynchronousProvision : bool
ModifiedByCallerApplicationId : int
ModifiedDate : DateTime
ProcessorId : int
ProvisioningClass : int

*Figure 9B*

ApplicationFilter

ApplicationIds : Guid[]
IncludeDeleted : bool

*Figure 9C*

OfferFilter

BaseOffersOnly : bool
Current : bool
IncludeDeleted : bool
Market : string

*Figure 9D*

Account

AccountId : SubscriptionId
AddOnAccounts : Accounts[]
Applications : Application[]
BaseAccountId : SubscriptionId
BaseOfferId : Guid
BillingObject : BillingObject
IsBeta : bool
IsTrial : bool
Market : string
OfferId : Guid
OwnerId : UserId
Referer : Referer
SubscriptionProxies : SubscriptionProxy[]
UserProxies : UserProxy[]

*Figure 9E*

Application

ApplicationId : Guid
ApplicationInstanceId : string
BaseApplciationId : Guid
BaseApplicationName : string
DisplayLocale : string
IsBeta : bool
IsTrial : bool
Name : string
Properties : ApplicationProperty[]
UserId : UserId

*Figure 9F*

ProviderApplication

ApplicationId : Guid
ApplicationInstanceId : string
DisplayLocale : string
IsBeta : bool
IsDisabled : bool
IsTrial : bool
Market : string
Name : string
Properties : ProviderApplicationProperty[]
RootAccountId : string
User : UserId

*Figure 9J*

ProviderApplicationUsageSummeryProperty

AllowedPropertyValue : string
Name : string
UsedPropertyValue : string

*Figure 9K*

ApplicationProviderGadgetRequest

GadgetId : string
RequestData : string

*Figure 9L*

ApplicationProviderGadgetResponse

CacheTime : TimeSpan
ResponseData : string

*Figure 9M*

ApplicationProviderGadgetResource

Css : string
Html : string
Javascript : string
Manifest : string

*Figure 9N*

CREATING, MANAGING, AND PROVISIONING PACKAGES OF ONLINE APPLICATIONS

BACKGROUND

The market for online application services is continuously growing and evolving. Many applications are available online that are offered on a subscription basis to individuals and businesses. A subset of the available online applications have become ubiquitous and necessary for just about any business, such as domain name services (DNS), email, and web hosting. Other online applications are useful to specific types of individuals and businesses, like web logs, user forums, team collaboration sites, document management platforms, or portal services. In addition, many applications traditionally implemented with in-house software and systems are now being offered online through the subscription model, such as office applications, accounting applications, and portfolio management services.

Online application service providers may offer packages of specific online applications that target particular types of subscribers. For instance, in addition to a standard business package of DNS, email, and web hosting applications, an online application service provider may offer a project management package for companies with individual project teams that adds team collaboration and document management applications, or a Blogger package for journalists that includes a web log application. In each of these cases, the resources allocated to each application may also be different depending on the target subscriber. For example, the project management package may offer subscribers one domain name with up to 100 email mailboxes, 20 gigabytes (GB) of document storage and a 10 megabyte (MB) website, while the blogger package may only include 1 email mailbox but 5 domain names and a 50 MB website.

As conditions in the marketplace or costs of resources change, the online application service provider may desire to change the online applications that are packaged within a specific offer, or change the level of resources allocated to each online application in the package. These changes may be applied retroactively to all current subscribers to the package, or they may only apply to new subscribers. In addition, the online application service provider may offer subscribers the ability to add additional resources to each of the online applications in their subscribed package. For example, a subscriber to the blogger package may add additional email mailboxes or a subscriber to the project management package may add 20 MB of storage to their website.

The online application service provider may desire to offer a particular package to subscribers for free, or allow subscribers a free trial period before converting the subscription to paid once the trial period has expired. Further, many of the online applications may be provided by application providers external to the online application service provider. These application providers may specialize in a particular application, such as DNS services, or offer a particular resource, such as online storage. The online application service provider may offer packages to subscribers that include both internally provided online applications and those provided by external application providers.

It is with respect to these considerations and others that the disclosure made herein is provided.

SUMMARY

Technologies are described herein for providing custom application programming interfaces (API) for creating, managing, and provisioning packages of online applications. In particular, an offer management service API is implemented and made accessible that provides methods enabling the management of offers for packages of online applications. A method is provided for the creation of a new offer. A caller of this method specifies the properties of the offer as well as a list of online applications to be packaged with the offer. The offer and associated list of online applications are stored in an offer store. Another method is provided for modifying the properties of an offer in the offer store, including changing the list of online applications packaged in the offer. According to one aspect of the disclosure, when the properties or list of online applications for an offer in the offer store are modified, each of the online applications packaged in the offer is re-provisioned with the new properties for current subscribers to the offer, in order to make the changes to an offer retroactive to existing subscribers. A method may also be provided for removing offers from the offer store.

The offer management service API also provides methods for adding and modifying information about each online application that is available for packaging within an offer. A caller of these methods specifies the properties of the online application to be added or modified. The information regarding online applications that are available for packaging in an offer is stored in the offer store. It should be appreciated, therefore, that the offer management service API allows a caller to manage the application information and also the different bundling of the applications.

According to other aspects presented herein, an offer provisioning API is implemented and made accessible that provides methods enabling the provisioning of online applications for subscribers to offers. A method is provided for creating a new account for a new subscriber. A caller of this method specifies the properties of the new account, including online applications to be provisioned for the account based upon the offer selected by the subscriber. The account is added to a subscription store. In one aspect of the disclosure, each online application packaged in the offer is provisioned immediately upon creation of the account. According to another aspect, the provisioning of some of the online applications is deferred until the subscriber first accesses it. Another method is provided for re-provisioning a specific online application associated with an account with new property values.

The offer provisioning API further provides a method for disabling a subscriber's account. Disabling of an account includes disabling each online application provisioned for the account. Another method is provided to re-enable a disabled account, which includes re-enabling all online applications provisioned for the account. A method is provided for closing a subscriber account. This includes de-provisioning all online applications provisioned for the account and removing the account from the subscription store. A method is also provided for converting an existing account to a new account type. A caller of this method specifies the properties of the new account type to which to convert the account, which may include a new list of online applications packaged in a different offer. The account properties are updated in the subscription store and each online application provisioned for the account is de-provisioned. In one aspect of the disclosure, the process of converting an account further includes provisioning each of the online applications associated with the new offer for the account.

According to further aspects, an application provider API is published and utilized to provision and maintain individual instances of online applications provided by application providers. To provision an instance of an online application for an account, a method of the API is called to validate whether an instance of an online application can be provisioned with the specified property values. If so, then another method of the API is called to provision the instance of the online application and the instance is assigned a unique instance ID. In one aspect presented herein, the property values for an instance of an online application, such as storage limits or allowed bandwidth, consist of a combination of a base value, which may be associated with an offer through which the online application is provided, and a relative value, which is specific to an account and may represent additional resources purchased by a subscriber.

To re-provision an instance of an online application with new property values, a method of the application provider API is called to validate whether the instance of the online application can be re-provisioned with the new property values. If so, another method is called to re-provision the instance of the online application. Similarly, to convert an instance of an online application to another application type, a method is called to validate that the instance of the online application can be converted to the new application type, and, if so, an associated method is called to convert the instance to the new application type. Another method of the API is called to de-provision an instance of an online application provided by an application provider. According to other aspects presented herein, additional methods of the application provider API are called to retrieve user interface (UI) details for an instance of an online application provided by an application provider. These UI details are utilized to present a UI to a subscriber to allow the subscriber to directly manage the instance of the online application.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a software class diagram showing various methods of an offer provisioning API, according to one embodiment described herein;

FIG. 5 is a software class diagram showing various methods of an application provider API, according to one embodiment described herein;

DETAILED DESCRIPTION

Figure 1:
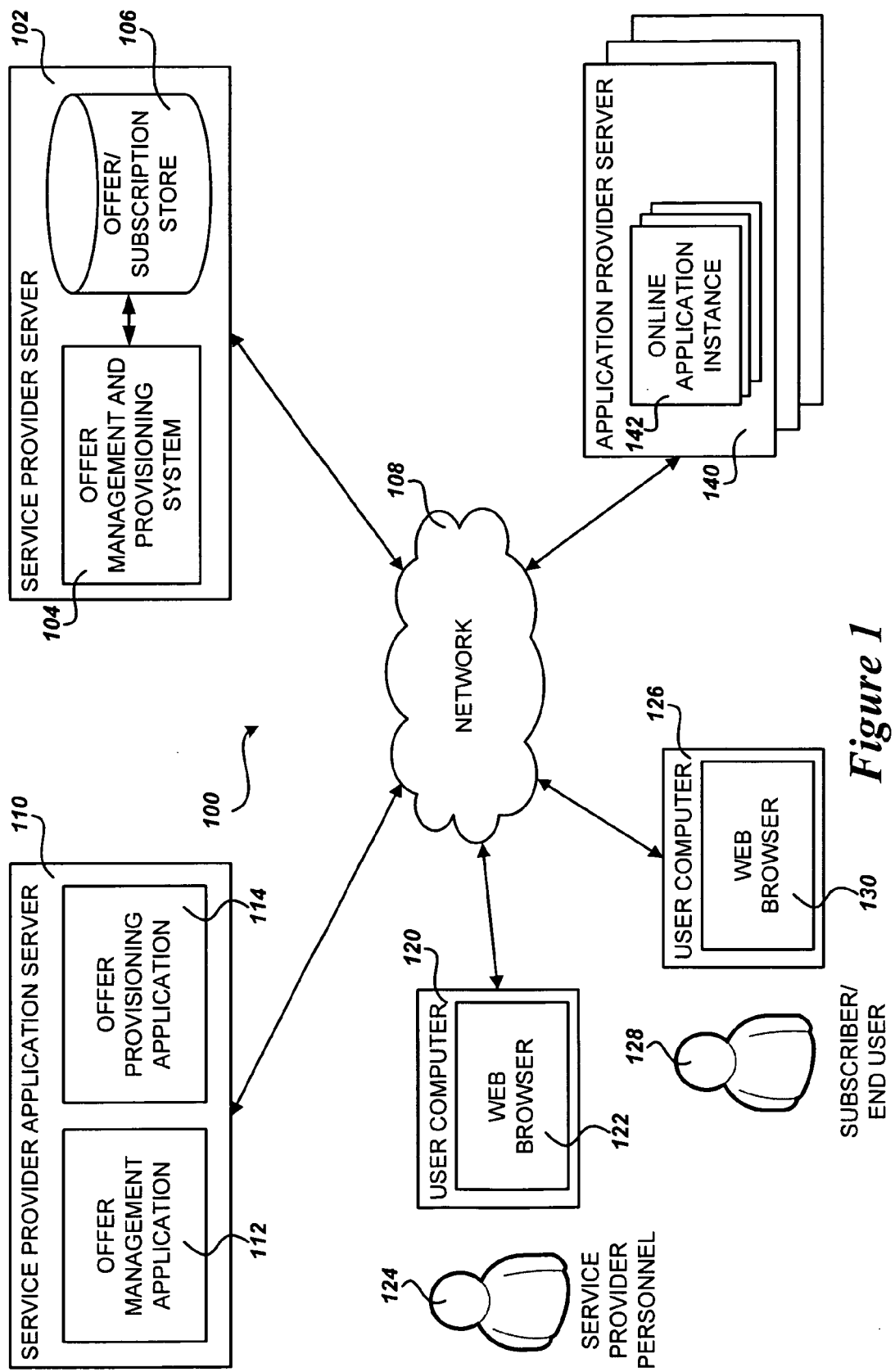
FIG. 1 is a network and software architecture diagram showing an illustrative operating environment for the methods and APIs described herein.

The following detailed description is directed to concepts and technologies for creating, managing, and provisioning packages of online applications with custom APIs. Through the use of the technologies and concepts presented herein, an online application service provider may implement an offer management and provisioning system that exposes a comprehensive offer management API that provides for the creation and management of offers for packages of online applications. The API can be accessed and utilized by internal and external software applications to allow sales and support personnel to create an offer for a package of online applications that targets a particular type of subscriber. The offer can include specific online applications with specific resources allocated to the applications, as required by the target subscriber. In addition, sales and support applications can utilize the API to modify the online applications and resources available in an offer as conditions in the marketplace change, such as when new online applications become available or the costs of resources change.

In addition, the offer management and provisioning system exposes an offer provisioning API that provides for the provisioning of online applications packaged in an offer for a subscriber. This API is utilized to provision each online application packaged within an offer for new subscribers, or to re-provision a specific online application with new parameters for an existing subscriber. An online application may need to be re-provisioned, for example, to allocate additional resources purchased by the subscriber, or to convert the online application from a free trial to a paid service.

The offer management and provisioning system provisions and manages the online applications for subscribers, whether provided by the online application service provider or an external application provider, through an application provider API. The application provider API is implemented by the application provider, and provides services for provisioning individual instances of an online application. Each instance of an online application is associated with a subscriber in the offer management and provisioning system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of creating, managing, and provisioning packages of online applications with custom APIs will be described.

Turning now to FIG. 1, details will be provided regarding an illustrative operating environment and several software components provided by the embodiments presented herein. FIG. 1 illustrates a system 100 comprised of an online application service provider server 102 which hosts the offer management and provisioning system 104. The offer management and provisioning system 104 implements the offer management and offer provisioning APIs, described in detail below, as well as the underlying functionality required to support the APIs. Data maintained and utilized by the offer management and provisioning system 104 is maintained in the offer/subscription data store 106. While the offer management and provisioning system 104 and data store 106 are illustrated in FIG. 1 as executing on a single server 102, it should be appreciated that these components may be distributed across a number of operatively connected servers or computing devices.

The service provider server 102 is operatively connected to a network 108. Consumers of the APIs implemented by the offer management and provisioning system 104 access the APIs via this network connection. In one embodiment, consumers of the APIs may include an offer management application 112 and an offer provisioning application 114 executing on an application server 110 operated by the online application service provider. These applications are accessed by service provider personnel 124 via a web browser 122 executing on a user computer 120 connected to the network 108. The service provider personnel 124 utilize these applications to create and manage offers for packages of online applications, create and maintain accounts for subscribers to the offers, and provision the online applications packaged in an offer for a subscriber. In further embodiments, consumers of the APIs may include a variety of applications operated internally or externally of the online application service provider and utilized by service provider personnel 124, subscribers, or other end users 128. For example, the APIs may be utilized by client applications like MICROSOFT OFFICE from MICROSOFT CORP. of Redmond, Wash.

The system 100, as illustrated in FIG. 1, also includes individual instances of online applications 142 executing on application provider servers 140 which are connected to the network 108. As will be described in detail below, an online application instance 142 is provisioned and managed for an individual subscriber 128 by the offer management and provisioning system 104 using an application provider API. Once provisioned, the subscriber or other end user 128 can access the services of the online application instance 142 over the network 1008 via a web browser 130 executing on a user computer 126 also connected to the network 108. According to one embodiment, the network 108 comprises the Internet. However, it should be appreciated that the network 108 may comprise a LAN, WAN, or other type of network suitable for allowing all consumers of the APIs to access the service provider computer 102. It may be further appreciated that many more networks and network connections may be utilized than illustrated in FIG. 1.

Figure 2:
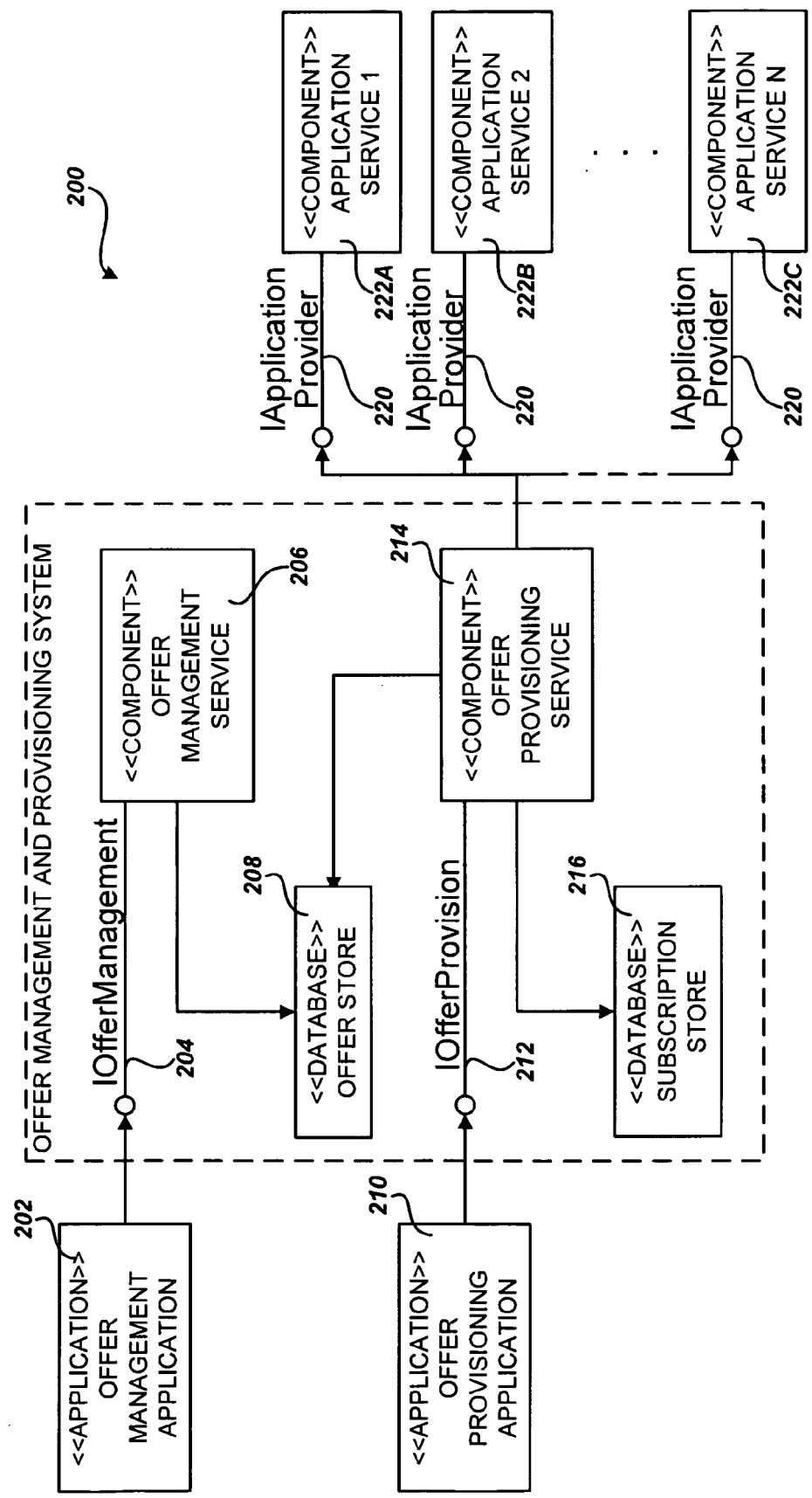
FIG. 2 is a software component diagram showing the relationship of the various components and APIs according to embodiments described herein.

FIG. 2 provides further details of the various components of the offer management and provisioning system 104, according to one embodiment. The offer management and provisioning system 104 includes an offer management service component 206 which provides the functionality required for creating and maintaining offers for packages of online applications. The functionality of the offer management service component 206 is made available through the offer management API IOfferManagement 204 and is accessed by the offer management application 202 by calling methods exposed by the IOfferManagement interface 204. The offer management service component 206 maintains information regarding the offers and the available online applications in an offer store 208.

The offer management and provisioning system 104 also includes an offer provisioning service component 214 which provides the functionality required for creating and maintain accounts for subscribers to offers and provisioning the online applications packaged in the offers for the subscribers. The functionality of the offer provisioning service component 214 is made available through the offer provisioning API IOfferProvision 212 and is accessed by the offer provisioning application 210 by calling methods exposed by the IOfferProvision interface 212. The offer provisioning service component 214 accesses the information about offers from the offer store 208 and maintains information regarding the accounts of subscribers and the online applications provisioned for the accounts in the subscription store 216.

As will be described in greater detail below, in order to provision an instance of a particular online application for a specific subscriber, the offer provisioning service component 214 accesses the application service component 222A, 222B, 222C for the particular online application through the application provider API IApplicationProvider 220. In addition to provisioning and de-provisioning individual instances of online applications, the application service component 222A, 222B, 222C is also responsible for maintaining the state of the online application instances, such as enabled, disabled, de-provisioned, etc.

In one embodiment, the IOfferManagement 204, IOfferProvision 212, and IApplicationProvider 220 interfaces are implemented as SOAP based Web Services which may be accessed by consumer applications through the Internet. It will be appreciated, however, that a number of technologies or protocols can be used to implement the interfaces disclosed herein. Such protocols include, but are not limited to, Representational State Transfer (REST) web services, Windows Communication Foundation (WCF) web services, Extensible Markup Language Remote Procedure Calls (XML-RPC), or any other protocol commonly known in the art.

In a further embodiment, access to the IOfferManagement 204, IOfferProvision 212, and IApplicationProvider 220 interfaces is controlled by a security mechanism that may limit access to particular methods of the APIs or limit visibility of objects and data in the offer store 208 and subscription store 216 based upon the caller of the API. For example, service provider personnel 124 from a particular service provider company accessing the IOfferProvision 212 API may only be able to access accounts in the subscription store 216 originally created by that service provider company or may only be allowed to provision certain offers and/or online applications for new subscribers.

Figure 3:
FIG. 3 is a software class diagram showing various methods of an offer management API, according to one embodiment described herein.

FIG. 3 provides further details of the IOfferManagement interface 204, according to embodiments disclosed herein. In particular, FIG. 3 illustrates a software class diagram 302 of the IOfferManagement interface 204 including methods exposed by the API. As discussed above, the IOfferManagement interface 204 and underlying offer management service component 206 maintain information regarding the offers and the available online applications in the offer store 208. According to one embodiment, the IOfferManagement interface 204 exposes an AddApplication method which adds a new online application to the list of available online applications in the offer store 208. The desired properties of the new online application, including the application provider providing the application services, are specified in an ApplicationConfig object passed to the method. If the call to this method is successful, then the method returns an application ID which may be used to identify the new application in subsequent method calls. In one embodiment, properties of a specific online application include configurable resource values necessary for the provisioning of that application. For instance, a web hosting application requires a storage resource value be configured indicating the maximum size of the file storage that will be allotted to the associated website.

According to further embodiments, the IOfferManagement interface 204 also exposes an UpdateApplication method, as illustrated in the software class diagram 302, which updates an existing online application in the offer store 208 with the desired properties from the specified ApplicationConfig object. The caller of this method first retrieves the ApplicationConfig object for the online application using the FindApplication method (discussed below), modifies the properties of the ApplicationConfig object as desired, and then calls the UpdateApplication method, passing the modified ApplicationConfig object, to record the changes in the offer store 208. The IOfferManagement interface 204 further exposes a FindApplication method which retrieves all existing online applications from the offer store 208 that match one or more filter values specified in the ApplicationFilter object passed to the method. Filters that may be specified include application ID, include deleted applications, etc. The FindApplication method returns an array of ApplicationConfig objects containing the properties of the matching online applications.

As further illustrated in the software class diagram 302, the IOfferManagement interface 204 exposes an AddOffer method, according to further embodiments, which adds a new offer to the offer store 208. The desired properties of the new offer, including the online applications to be packaged in the offer, are specified in an OfferConfig object passed to the method. If the call to the AddOffer method is successful, then the method returns an offer ID which may be used to identify the new offer in subsequent method calls. In one embodiment, the properties of an offer include the maximum number of instances of each online application that may be provisioned and the base values for any configurable resources required by the online applications. For example, to add an offer for a basic business package of online applications including a domain name, five email mailboxes with 1 GB of storage each, and a 50 MB website, the OfferConfig object may be populated with the application ID for the DNS application with the maximum number of instances set to one; the application ID for the email application with the maximum number of instances set to five and a base configuration value for the storage resource set to 1 GB; and the application ID for the web hosting application with the maximum number of instances set to one and a base configuration value for the storage resource set to 50 MB.

In further embodiments, the IOfferManagement interface 204 also exposes an UpdateOffer method which updates an existing offer in the offer store 208 with the desired properties from the specified OfferConfig object. A caller of this method first retrieves an OfferConfig object for the offer using the FindOffer or FindSingleOffer methods (discussed below), modifies the properties of the OfferConfig object as desired, and then calls the UpdateOffer method, passing the modified OfferConfig object, to record the changes in the offer store 208. In one embodiment, when the properties of an offer are modified by the UpdateOffer method, each of the online applications packaged in the offer are re-provisioned with the new property values for current subscribers to the offer. This allows the changes to an offer to be applied retroactively to existing subscribers.

The IOfferManagement interface 204 further exposes a FindSingleOffer method, as illustrated in the software class diagram 302, which retrieves an existing offer from the offer store 208 having the specified offer ID. The method returns an OfferConfig object containing the properties of the offer, if it exists. Similarly a FindOffer method is exposed which retrieves offers from the offer store 208 that match one or more filter values specified in the OfferFilter object passed to the method. Filters that may be specified include a market, include base offers only, include only current offers (only valid offers which are not expired), include deleted offers, etc. An array of OfferConfig objects is returned by the FindOffer method containing the properties of any matching offers. In a further embodiment, the IOfferManagement interface 204 also exposes a DeleteOffer method which deletes an offer from the offer store 208 having the specified offer ID, if it exists.

It will be appreciated by one of ordinary skill in the art, that the methods illustrated in the software class diagram 302 of FIG. 3 represent those necessary for maintaining information regarding the offers and available online applications in the offer store. Many more methods may be exposed by the IOfferManagement interface 204, depending on the capabilities and requirements of the underlying offer management service component 206. It will be further appreciated that the IOfferManagement interface 204 also exposes the class definitions for objects utilized in calling the methods of the API, including the OfferConfig, OfferFilter, ApplicationConfig, and ApplicationFilter classes discussed above. According to embodiments, the OfferConfig class may be defined as illustrated in FIG. 9A. In addition, the ApplicationConfig class may be defined as illustrated in FIG. 9B, the ApplicationFilter class may be defined as illustrated in FIG. 9C, and the OfferFilter class may be defined as illustrated in FIG. 9D.

FIG. 4 provides a software class diagram 402 of the IOfferProvision interface 212 including methods exposed by the API, according to representative embodiments disclosed herein. As discussed above, the IOfferProvision interface 212 and underlying offer provisioning service component 214 access the information about offers from the offer store 208 and maintain information regarding the accounts of subscribers and the online applications provisioned for the account in the subscription store 216. According to one embodiment, the IOfferProvision interface 212 exposes a GetAccountTemplate method which returns an Account object with properties pre-set according to the offer in the offer store 208 having the specified offer ID. The pre-set properties include the list of online applications to be provisioned for the account along with the maximum number of instances and the base values for any configurable resources for each. In order to provision a new account for a subscriber to a particular offer, a provisioning caller calls this method to create a pre-populated Account object for the specified offer ID, modifies the properties of the Account object to match the desired details for the subscriber, and calls the ProvisionAccount method (discussed below) to create the account in the subscription store 216 and provision the online applications for the account.

According to further embodiments, the IOfferProvision interface 212 also exposes a ProvisionAccount method, as illustrated in the software class diagram 402, which creates an account for a subscriber in the subscription store 216 and provisions the associated online applications for the account. The desired properties of the new account, including the list of online applications to be provisioned for the account, the maximum number of instances for each, and the configuration values for resources for each, are specified in the Account object passed to the method. If the call is successful, then the ProvisionAccount method returns a SubscriptionId object which may be used to identify the account in subsequent method calls. In one embodiment, configuration values for resources consist of base values and relative values. The base values are supplied from the offer associated with the account, while relative values represent additional resources specific to this account. For example, a web hosting application may be packaged in an offer which includes a base storage resource value of 20 MB. When an account is created from the offer for a new subscriber, the subscriber may desire to add an additional 20 MB of storage to the web hosting application for a total of 40 MB. This is accomplished by specifying a relative value of 20 MB for the storage resource when provisioning the web hosting application for the subscriber in addition to the base value of 20 MB. If the base value in the offer is later changed to 50 MB, the web hosting application for the subscriber will be re-provisioned with 70 MB of storage, representing the new base value of 50 MB and the relative value of 20 MB associated with this account.

In an alternative embodiment, some of the online applications associated with the account are not provisioned immediately upon creation of the account by the ProvisionAccount method. Instead, provisioning is deferred until the online applications are first accessed by the subscriber. This just-in-time provisioning allows for more efficient use of resources by application providers. For example, an account may include an online backup application which allocates a large amount of file storage when provisioned. When the account is created by the ProvisionAccount method, provisioning of the online backup application may be deferred until the subscriber first attempts to access the online backup application. Upon the first attempt to access the application by the subscriber, the ProvisionApplication method (described below) may be called to provision the online application and allocate the resources necessary.

As illustrated in the software class diagram 402, the IOfferProvision interface 212 also exposes a ProvisionApplication method, according to further embodiments, which provisions a single online application for an existing account identified by the specified SubscriptionId object. The desired properties of the online application to be provisioned for the account are specified in the Application object passed to the method. If the call is successful, then the method returns an application instance ID which may be used to identify the instance of the provisioned online application in subsequent method calls. This method may be used when additional instances of an online application are to be provisioned for an account. For example, if a particular offer includes web hosting and 10 email mailboxes, the web hosting application and one email mailbox application may be initially provisioned for an account created for a subscriber to the offer by the ProvisionAccount method (described above). A provisioning caller may call this method to provision an additional email mailbox application for the now existing account. This method could be called for the account once for each of the 9 additional email mailboxes included in the offer.

In further embodiments, the IOfferProvision interface 212 also exposes a ReprovisionApplication method which re-provisions a single online application for an existing account identified by the specified SubscriptionId object. The desired properties of the online application to be re-provisioned for the account are specified in the Application object passed to the method. This method may be used when the property values of the online application are changed, such as when the base resource values for an online application packaged in an offer are modified, as discussed above in regard to the UpdateOffer method. The IOfferProvision interface 212 further exposes a DeprovisionAccount method which de-provisions the online applications provisioned for an existing account, identified by the specified SubscriptionId object, and removes the account information from the subscription store 216. Similarly, a DeprovisionApplication method is exposed which de-provisions a specific application instance provisioned for an existing account identified by the specified SubscriptionId object. The specific instance of the online application to de-provision is specified by the application ID and applications instance ID passed to the method. This method may be used when only one online application provisioned for an account is to be de-provisioned. For example, this method may be called to de-provision a particular email mailbox application for an account that has multiple email mailboxes active.

As illustrated in the software class diagram 402, the IOfferProvision interface 212 also exposes a DisableAccount method, according to further embodiments, which disables the online applications provisioned for an existing account identified by the specified SubscriptionId object. This method may be used to temporarily disable the online applications provisioned for the account, without de-provisioning them. For example, if a subscriber does not pay his subscription fees, his account may be disabled until the fees are paid. In addition, the IOfferProvision interface 212 also exposes an EnableAccount which re-enables online applications provisioned for a previously disabled account identified by the specified SubscriptionId object.

According to further embodiments, the IOfferProvision interface 212 exposes also exposes a ConvertAccount method, as illustrated in the software class diagram 402, which converts an existing account identified by the specified SubscriptionId object to a new account type. The properties of the new account type are specified in the target Account object passed to the method. This method may be called to move a subscriber to a different offer when the current offer upon which the subscriber's account is based is no longer available, or when upgrading the subscriber to an offer that includes additional online applications or new base resource values. A provisioning caller would call the GetAccountTemplate method (described above) for the new offer to create the target Account object with the properties of the new offer and then call this method to convert the specified account. In one embodiment, this method de-provisions online applications no longer included in the new offer and re-provisions online applications requiring new base resource values, but does not provision new online applications for the account. The provisioning caller must call the ProvisionApplication method (described above) to provision each new online application included in the new offer individually.

The IOfferProvision interface 212 also exposes GetGadgetRendering and GetGadgetResource methods, according to further embodiments, which requests gadget UI details for a specific instance of an online application identified by the application ID and application instance ID passed to the method. The UI details of the gadget are returned in the GadgetResponse and GadgetResource objects returned by the methods, respectively. A gadget is a UI element that can be incorporated into an external application and provides access to and maintenance of parameter values that are unique to a specific online application. For example, an online backup service application provided by a particular application provider may allow a user to schedule when backups are to take place and what files and folders of a computer are to be backed-up. The offer management and provisioning system 104 may have no awareness of these parameters when provisioning individual instances of the online backup service application for subscribers. If the application provider provides a gadget UI that allows the provisioning caller to adjust these parameters, the provisioning of the online backup service application can be accomplished through a single interface. The provisioning caller would call these methods to retrieve the details of the gadget UI in order to implement them into the provisioning interface being displayed to the provisioning user. In one embodiment, the gadget details include a combination of HTML, CSS, and JavaScript which can be rendered inside a web interface to an offer provisioning application 114.

In further embodiments, the IOfferProvision interface 212 also exposes a GetPropertySummaries method which requests resource usage details for a specific application instance provisioned for an existing account identified by the specified SubscriptionId object. The specific instance of the online application for which to retrieve the resource usage details is specified by the application ID and application instance ID passed to the method, as illustrated in the software class diagram 402. This method returns an array of ApplicationPropertySummary objects which contain the configured and currently used values for all application specific configurable resource values for the application instance. For example, if a web hosting application is currently provisioned for an account with its storage resource configured with a base value of 20 MB and a relative value of 20 MB, and the corresponding website currently utilizes 37 MB of storage, an ApplicationPropertySummary object would be returned by the method indicating the storage resource property having a configured value of 40 MB and a currently used value of 37 MB. This information may be used to display the current resource usage and percentage of configured amount for each to a subscriber of the online applications provisioned for his account.

According to further embodiments, the IOfferProvision interface 212 exposes a RenameApplication method, as illustrated in the software class diagram 402, which renames a specific instance of an online application provisioned for an existing account identified by the specified SubscriptionId object. The specific instance of the online application to be renamed is specified by the application ID and applications instance ID passed to the method. This method may be used to change the name associated with an instance of an online application that is identified by name, such as an email application which is identified by the email address or a web hosting application which is identified by its web address (URL).

Figure 9G:
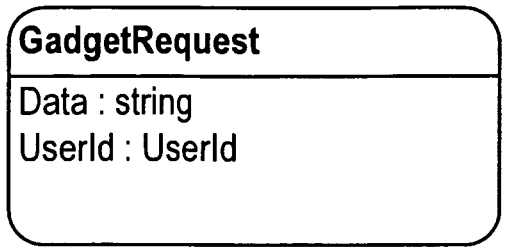
FIGS. 9A-9N are software class diagrams showing illustrative class definitions for objects utilized in calling the methods of the APIs described herein, according to embodiments.
Figure 9H:
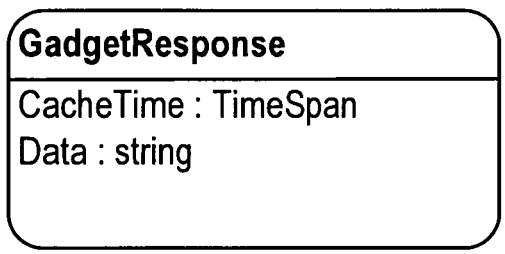
Figure 9I:
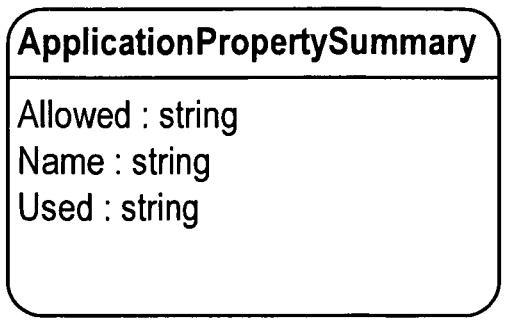

As discussed above, it will be appreciated that many more methods may be exposed by the IOfferProvision interface 212 than those illustrated in the software class diagram 402 of FIG. 4, depending on the capabilities and requirements of the underlying offer provisioning service component 214. It will be further appreciated that the IOfferProvision interface 212 also exposes the class definitions for objects utilized in calling the methods of the API, including the Account, SubscriptionId, Application, GadgetResponse, GadgetRequest, GadgetResource, and ApplicationPropertySummary classes discussed above. According to embodiments, the Account class may be defined as illustrated in FIG. 9E. In addition, the Application class may be defined as illustrated in FIG. 9F, the GadgetRequest class may be defined as illustrated in FIG. 9G, the GadgetResponse class may be defined as illustrated in FIG. 9H, and the ApplicationPropertySummary class may be defined as illustrated in FIG. 9I.

FIG. 5 illustrates a software class diagram 502 of the IApplicationProvider interface 220 including methods exposed by the API, according to representative embodiments disclosed herein. As discussed above, the IApplicationProvider interface 220 is utilized by the offer provisioning service component 214 to provision individual instances of online applications implemented by an application provider. The use of the IApplicationProvider interface 220 allows the offer provisioning service component 214 to provision and manage online application instances provided by multiple, internal and external application providers while offering a single interface, the IOfferProvision interface 212, to provisioning callers, such as the offer provisioning application 113 discussed above. According to one embodiment, the IApplicationProvider interface 220 exposes a ValidateProvisionApplication which validates that an instance of an online application can be provisioned at the application provider with the specified property values. The ProviderApplication object passed to the method provides the properties of the online application to be provisioned. The method returns a ValidationResponse object, as illustrated in the software class diagram 502, which indicates whether the online application can be provisioned with the specified property values. In one embodiment, the offer provisioning service component 214 calls this method before making an associated ProvisionApplication method call, discussed below.

According to further embodiments, the IApplicationProvider interface 220 also exposes a ProvisionApplication method, as illustrated in the software class diagram 502, which provisions a new instance of an online application at the application provider. This method supports the ProvisionApplication method implemented in the IOfferProvision interface 212, discussed above. The ProviderApplication object passed to the method provides the properties of the online application to be provisioned. The ProviderApplication object includes the unique application instance ID generated by the offer provisioning service component 214.

As illustrated in the software class diagram 502, the IApplicationProvider interface 220 also exposes a ValidateReprovisionApplication method, according to further embodiments, which validates that a specific instance of an online application at the application provider can be re-provisioned with the specified property values. Just as in the ValidateProvisionApplication method discussed above, the offer provisioning service component 214 calls this method before making an associated ReprovisionApplication call. The IApplicationProvider interface 220 further exposes the ReprovisionApplication method which re-provisions an instance of an online application at the application provider with new property values specified in the ProviderApplication object passed to the method. This method supports the ReprovisionApplication method implemented in the IOfferProvision interface 212, discussed above.

In further embodiments, the IApplicationProvider interface 220 also exposes a DisableApplication which disables an instance of an online application at the application provider, without de-provisioning it. This method supports the DisableAccount method implemented in the IOfferProvision interface 212, discussed above. The ProviderApplication object passed to the method, as illustrated in the software class diagram 502, provides the unique application instance ID of the instance of the online application to be disabled. In addition, the IApplicationProvider interface 220 also exposes an EnableApplication method which re-enables a previously disable instance of an online application at the application provider. This method supports the EnableAccount method implemented in the IOfferProvision interface 212, discussed above. The ProviderApplication object passed to the method provides the unique application instance ID of the instance of the online application to be re-enabled.

According to further embodiments, the IApplicationProvider interface 220 exposes a DeleteApplication method which de-provisions an instance of an online application at the application provider. This method supports the DeprovisionApplication and DeprovisionAccount methods implemented in the IOfferProvision interface 212, discussed above. The ProviderApplication object passed to the method provides the unique application instance ID of the instance of the online application to be de-provisioned. Similarly, the IApplicationProvider 220 exposes a RenameApplication which renames an instance of an online application at the application provider. This method supports the RenameApplication method implemented in the IOfferProvision interface 212, discussed above. The ProviderApplication object passed to the method provides the unique application instance ID of the instance of the online application to be renamed. As further illustrated in the software class diagram 502, the IApplicationProvider interface 220 exposes GetGadgetRenderingDetails, GetGadgetResource, and GetUsage methods that support the GetGadgetRendering, GetGadgetResource, and GetPropertySummaries methods, respectively, implemented in the IOfferProvision interface 212, discussed above.

Further, the IApplicationProvider interface 220 also exposes the class definitions for the objects utilized in calling the methods of the API, including the ValidationResponse, ProviderApplication, ApplicationProviderGadgetResponse, ApplicationProviderGadgetRequest, ApplicationProviderGadgetResource, and ProviderApplicationUsageSummaryProperty classes discussed above. According to embodiments, the ProviderApplication class may be defined as illustrated in FIG. 9J. In addition, the ProviderApplicationUsageSummaryProperty class may be defined as illustrated in FIG. 9K, the ApplicationProviderGadgetRequest class may be defined as illustrated in FIG. 9L, the ApplicationProviderGadgetResponse class may be defined as illustrated in FIG. 9M, and the ApplicationProviderGadgetResource class may be defined as illustrated in FIG. 9N. It will be appreciated by one of ordinary skill in the art that many more methods may be exposed IApplicationProvider interface 220 than those illustrated in the software class diagram 502 of FIG. 5.

Figure 6:
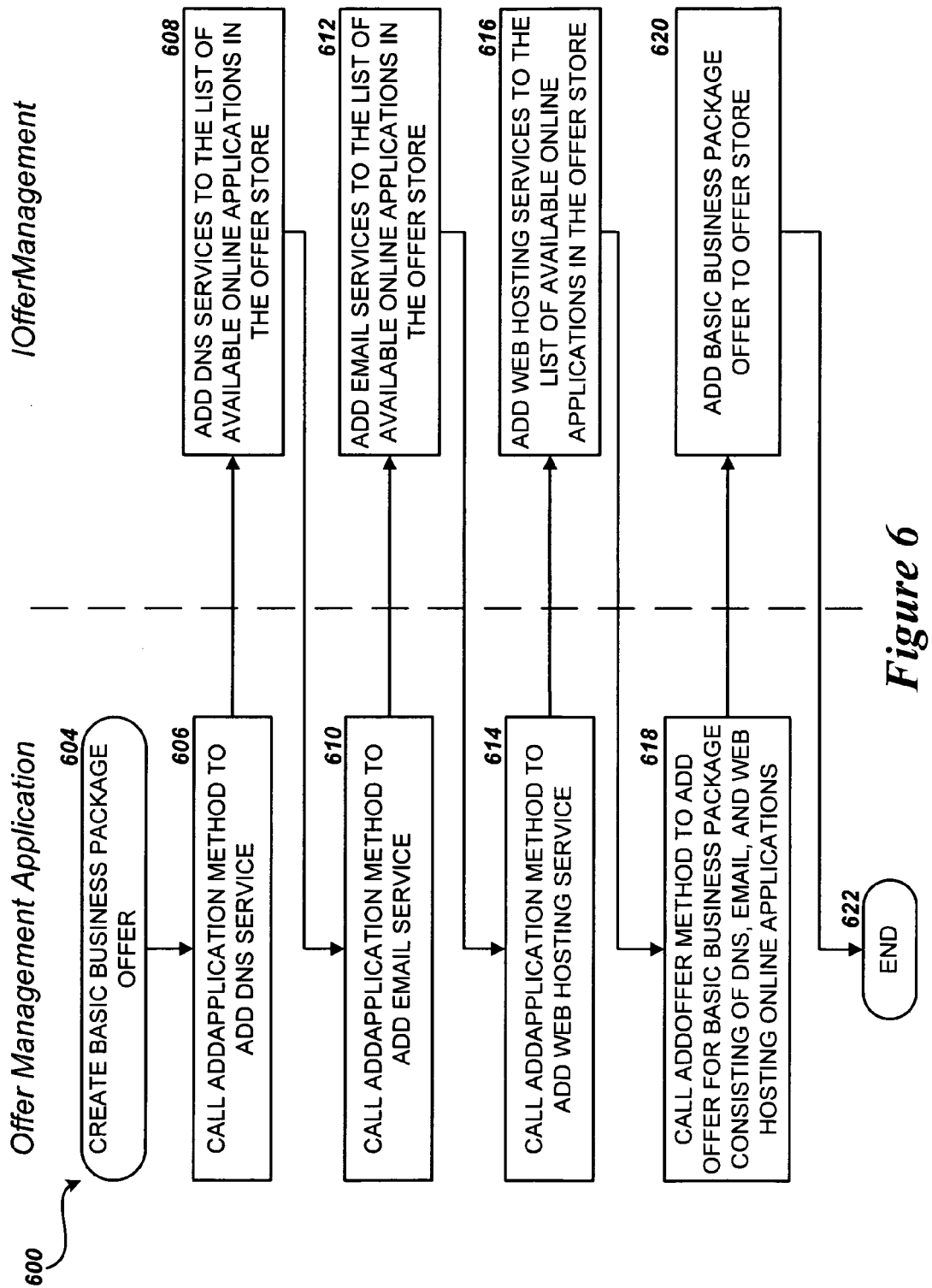
FIGS. 6 and 7A-7D are flow diagrams illustrating processes for creating, managing, and provisioning packages of online applications utilizing the APIs provided herein, according to embodiments.

Referring now to FIG. 6, additional details will be provided regarding the embodiments presented herein for providing custom APIs for creating, managing, and provisioning packages of online applications. In particular, FIG. 6 is a flow diagram illustrating an example of creating an offer for a package of online applications utilizing the methods of the APIs described above. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 604, where an offer management application 202 desires to create a new offer for a basic business package consisting of DNS, email, and web hosting applications. In the present example, the offer is to include one domain name, five email mailboxes with 1 GB of storage each, and a 50 MB website. For the purposes of this example, it is assumed that the list of available online applications in the offer store 208 is empty. From operation 604, the routine 600 proceeds to operation 606, where the offer management application 202 calls the AddApplication method of the IOfferManagement interface 204 to add the DNS application service to the list of available online applications. The details of the DNS application, such as the associated application provider and the configurable resource values necessary for the provisioning of that application, are specified in the call to the AddApplication method. For example, the DNS application services may be provided by a third party application provider such as the domain name registration service REGISTER.COM. In response to the AddApplication method call in operation 606, the routine 600 proceeds to operation 608 where the offer management service 206 adds the information regarding the DNS application to the list of available online applications in the offer store 208. The AddApplication method returns a unique application ID for the DNS application to the offer management application 202.

From operation 608, the routine 600 continues to operation 610 where the process described above is repeated for the email application. In operation 610, the offer management application 202 calls the AddApplication method of the IOfferManagement interface 204 to add the email application service to the list of available online applications. The details of the email application may include a configurable storage resource value, indicating the maximum amount of storage available to an associated email mailbox. In response to the AddApplication method call in operation 610, the routine 600 proceeds to operation 612 where the offer management service 206 adds the information regarding the email application to the list of available online applications in the offer store 208. The AddApplication method returns a unique application ID for the email application to the offer management application 202.

From operation 612, the routine 600 continues to operation 614 where the offer management application 202 calls the AddApplication method to add the web hosting application service, including a configurable storage resource value, to the list of available online applications. In response to the method call in operation 614, the routine 600 proceeds to operation 616 where the offer management service 206 adds the information regarding the web hosting application to the list of available online applications in the offer store 208. The AddApplication method returns a unique application ID for the web hosting application to the offer management application 202.

The routine 600 then continues from operation 616 to operation 618, where the offer management application 202 calls the AddOffer method of the IOfferManagement interface 204 to create the new offer for the basic business package. The details of the new offer, such as the online applications to be packaged in the offer, the maximum number of instances of each, and the base values for any configurable resources required by the online applications, are specified in the call to the AddOffer method. In the present example, the AddOffer method call at operation 618 would specify the DNS application added above with the maximum number of instances set to one; the email application added above with the maximum number of instances set to five and a base configuration value for the storage resource set to 1 GB; and the web hosting application added above with the maximum number of instances set to one and a base configuration value for the storage resource set to 50 MB. In response to the AddOffer method call in operation 618, the routine 600 proceeds to operation 620 where the offer management service 206 adds the information regarding the offer to the offer store 208. The AddOffer method returns a unique offer ID for the basic business package offer to the offer management application 202. From operation 620, the routine 600 proceeds to operation 622 where the process ends.

Figure 7A:
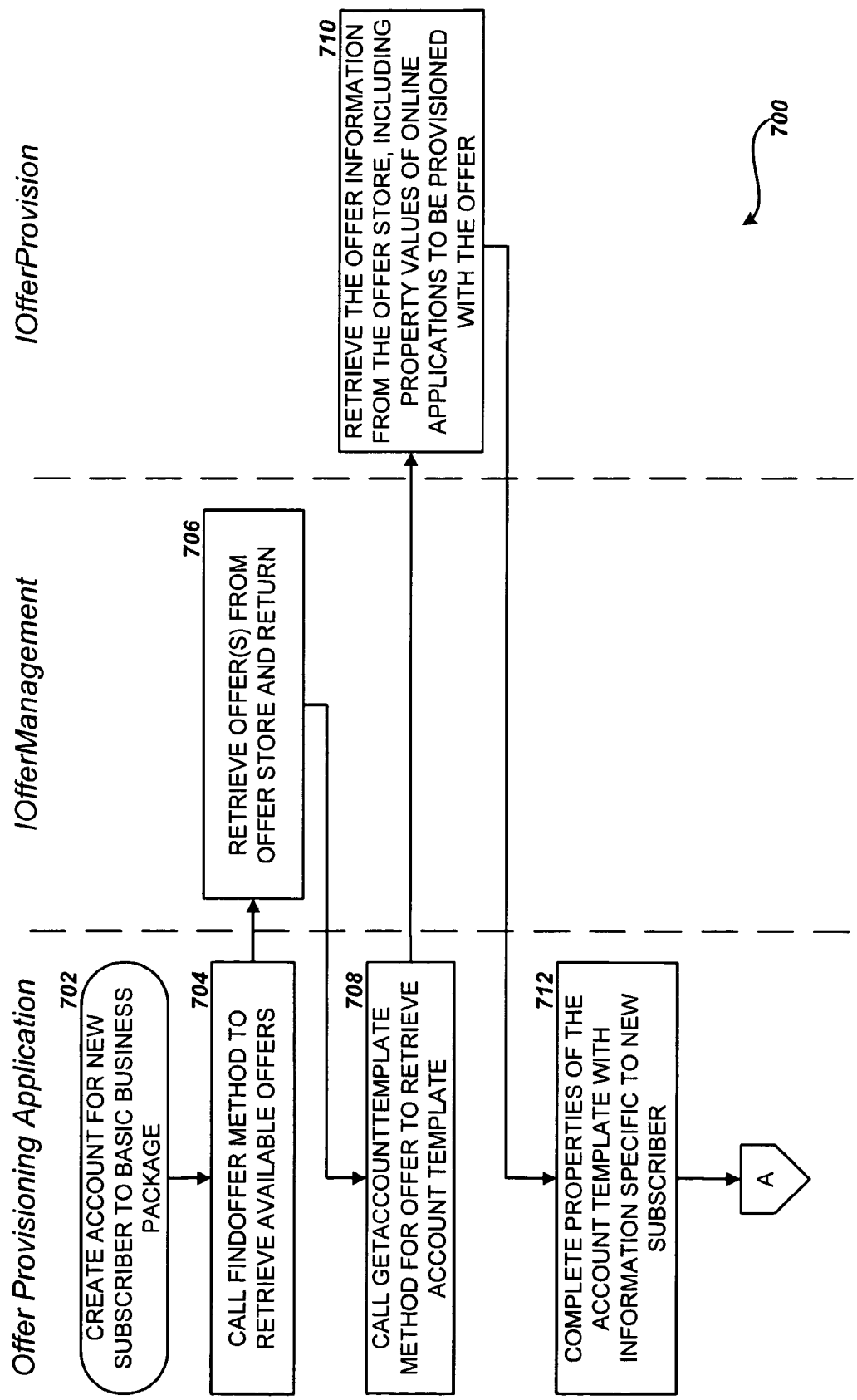

By way of further example, FIGS. 7A-7D provide a flow diagram illustrating the provisioning of the online applications packaged in the basic business package offer for a new subscriber, utilizing the methods of the APIs described above, according to one embodiment. The routine 700 begins at operation 702, as illustrated in FIG. 7A, where an offer provisioning application 210 desires to create an account for a new subscriber to the basic business package offer, describe above in regard to FIG. 6. From operation 702, the routine 700 proceeds to operation 704, where the offer provisioning application 210 calls the FindOffer method of the IOfferManagement interface 204 to retrieve a list of all available offers. In response to the method call, the routine 700 proceeds to operation 706 where the offer management service 206 retrieves the list of available offers from the offer store 208, including the basic business package offer, and returns the list to the offer provisioning application 210.

From operation 706, the routine 700 then proceeds to operation 708 where the offer provisioning application 210 selects the desired basic business package offer from the returned list of available offers and calls the GetAccountTemplate method of the IOfferProvision interface 212 to retrieve the account template information used to create a new account for the offer. In response to the method call, the routine 700 proceeds to operation 710 where the offer provisioning service 214 retrieves the details of the offer from the offer store 208, including the list of online applications included with the offer, along with the maximum number of instances and the base values for any configurable resources for each. In the present example, this would include a DNS application with the maximum number of instances set to one, an email application with the maximum number of instances set to five and a base configuration value for the storage resource set to 1 GB, and a web hosting application with the maximum number of instances set to one and a base configuration value for the storage resource set to 50 MB. The offer provisioning service 214 returns the account template information to the offer provisioning application 210.

The routine 700 then proceeds from operation 710 to operation 712, where the offer provisioning application 210 adds to the template information returned by the GetAccountTemplate method the information specific to this subscriber, such as the identity of the subscriber and any additional resources to be provisioned for a particular online application. For example, the subscriber may wish to add 20 MB of storage to the web hosting application for a total of 70 MB of storage. This is accomplished by specifying a relative value of 20 MB for the storage resource along with the base value of 50 MB retrieved in the template information, as described above in regard to the ProvisionApplication method.

Figure 7B:
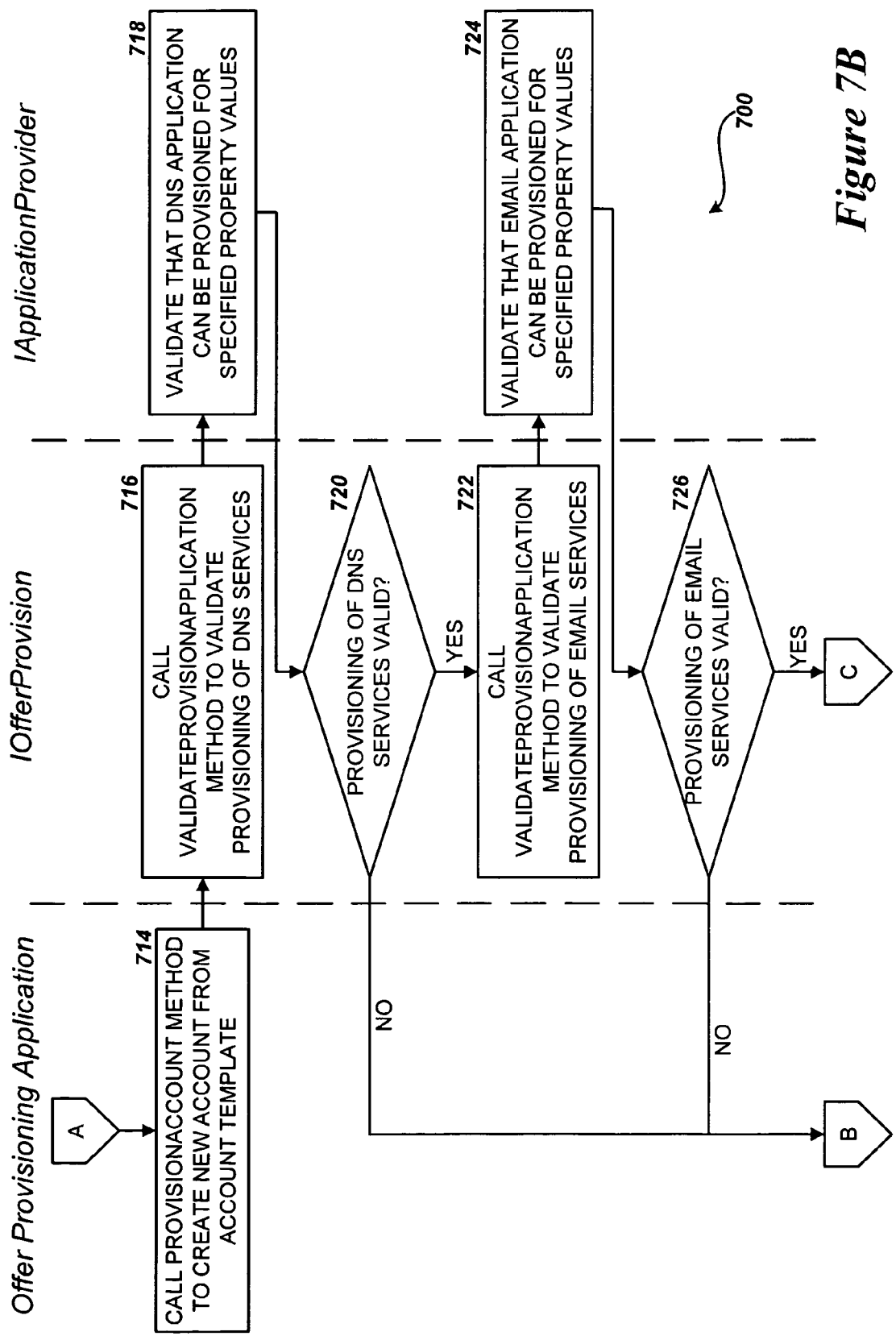

Once the subscriber specific information is added to the template information in operation 712, the routine 700 proceeds to operation 714, as illustrated in FIG. 7B, where the offer provisioning application 210 calls the ProvisionAccount method of the IOfferProvision interface 212 with the template information in order to create a new account for the subscriber and provision the online applications for the account. In response to the ProvisionAccount method call, the routine 700 proceeds to operation 716 where the offer provisioning service 214 calls the ValidateProvisionApplication method of the IApplicationProvider interface 220 implemented by the application provider associated with the DNS application to validate whether the DNS application can be provisioned for the account with the specified property values. In response to the ValidateProvisionApplication method call, the routine 700 proceeds to operation 718 where the application service 222A of the application provider associated with the DNS application verifies that the DNS application can be provisioned with the given property values. For example, the application service 222A may verify that the desired domain name is available for registration at operation 718. The application service 222A method returns a flag to the offer provisioning service 214 indicating whether the DNS application can be successfully provisioned.

Figure 7C:
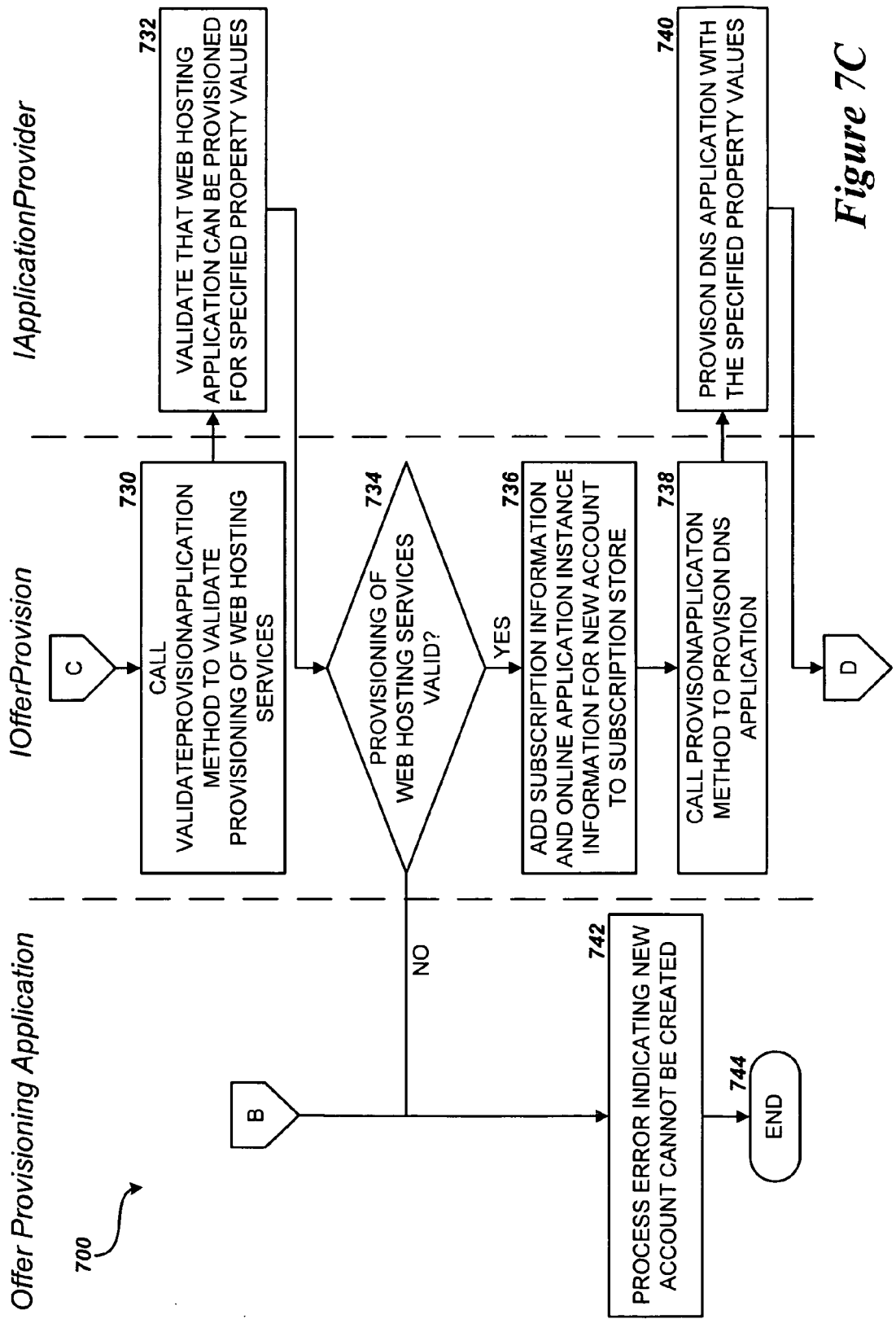

From operation 718, the routine 700 proceeds to operation 720, where the offer provisioning service 214 evaluates whether the DNS application can be successfully provisioned based upon the flag returned by the ValidateProvisionApplication method. If the DNS application cannot be provisioned, the offer provisioning service 214 in operation 720 returns an associated error to the offer provisioning application 210 and the routine 700 proceeds to operation 742, as illustrated in FIG. 7C, where the offer provisioning application 210 processes the error accordingly. If the DNS application can be provisioned with the specified property values, the routine 700 proceeds to operation 722 in FIG. 7B, where the validation process is repeated for the email application. The offer provisioning service 214 calls the ValidateProvisionApplication method of the IApplicationProvider interface 220 implemented by the application provider associated with the email application to validate whether the email application can be provisioned for the account with the specified property values. In response to the ValidateProvisionApplication method call, the routine 700 proceeds to operation 724 where the application service 222B of the application provider associated with the email application verifies that the email application can be provisioned with the given property values and returns a flag to the offer provisioning service 214 indicating the result.

The routine 700 then proceeds from operation 724 to operation 726, where the offer provisioning service 214 evaluates whether the email application can be successfully provisioned based upon the flag returned by the ValidateProvisionApplication method. If the email application cannot be provisioned, the offer provisioning service 214 in operation 726 returns an associated error to the offer provisioning application 210 and the routine 700 proceeds to operation 742, as illustrated in FIG. 7C, where the offer provisioning application 210 processes the error accordingly. If the email application can be provisioned, the routine 700 proceeds to operation 730 in FIG. 7C, where the validation process is again repeated for the web hosting application. The offer provisioning service 214 calls the ValidateProvisionApplication method of the IApplicationProvider interface 220 implemented by the application provider associated with the web hosting application to validate whether the web application can be provisioned for the account with the specified property values. In response to the ValidateProvisionApplication method call, the routine 700 proceeds to operation 732 where the application service 222C of the application provider associated with the web hosting application verifies that the web hosting application can be provisioned with the given property values and returns a flag to the offer provisioning service 214 indicating the result.

From operation 732, the routine 700 proceeds to operation 734, where the offer provisioning service 214 evaluates whether the web hosting application can be successfully provisioned based upon the flag returned by the ValidateProvisionApplication method. If the web hosting application cannot be provisioned, the offer provisioning service 214 in operation 734 returns an associated error to the offer provisioning application 210 and the routine 700 proceeds to operation 742 where the offer provisioning application 210 processes the error accordingly. If the email application can be provisioned, the routine 700 proceeds to operation 736, where the offer provisioning service 214 creates a new account in the subscription store 216 with the template information and the properties of each instance of the online applications to be provisioned for the account. The routine 700 then proceeds from operation 736 to operation 738, where the offer provisioning service 214 calls the ProvisionApplication method of the IApplicationProvider interface 220 implemented by the application provider associated with the DNS application to provision the DNS application for the account with the specified property values. In response to the ProvisionApplication method call, the routine 700 proceeds to operation 740 where the application service 222A of the application provider associated with the DNS application provisions an instance of the DNS application with the specified property values.

Figure 7D:
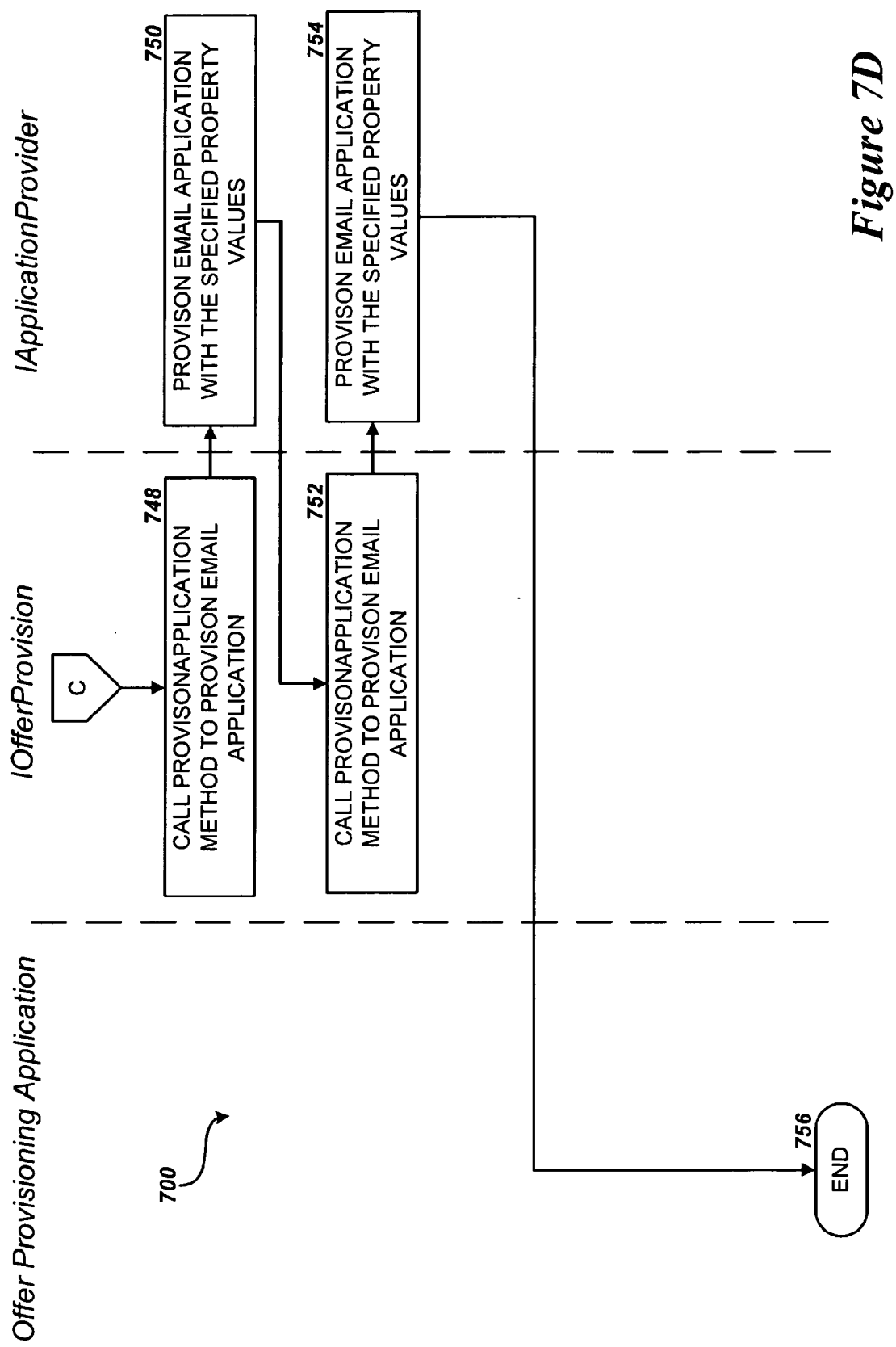

From operation 740, the routine 700 then proceeds to operation 748, as illustrated in FIG. 7D, where the provisioning process is repeated for the email application. The offer provisioning service 214 in operation 748 calls the ProvisionApplication method of the IApplicationProvider interface 220 implemented by the application provider associated with the email application. In response to the method call, the routine 700 proceeds to operation 750 where the application service 222B of the application provider associated with the email application provisions an instance of the email application with the specified property values. The routine 700 then proceeds from operation 750 to operation 752 where the offer provisioning service 214 calls the ProvisionApplication method of the IApplicationProvider interface 220 implemented by the application provider associated with the web hosting application. In response to the method call, the routine 700 proceeds to operation 754 where the application service 222C of the application provider associated with the web hosting application provisions an instance of the web hosting application with the specified property values. The routine 700 then ends at operation 756.

Figure 8:
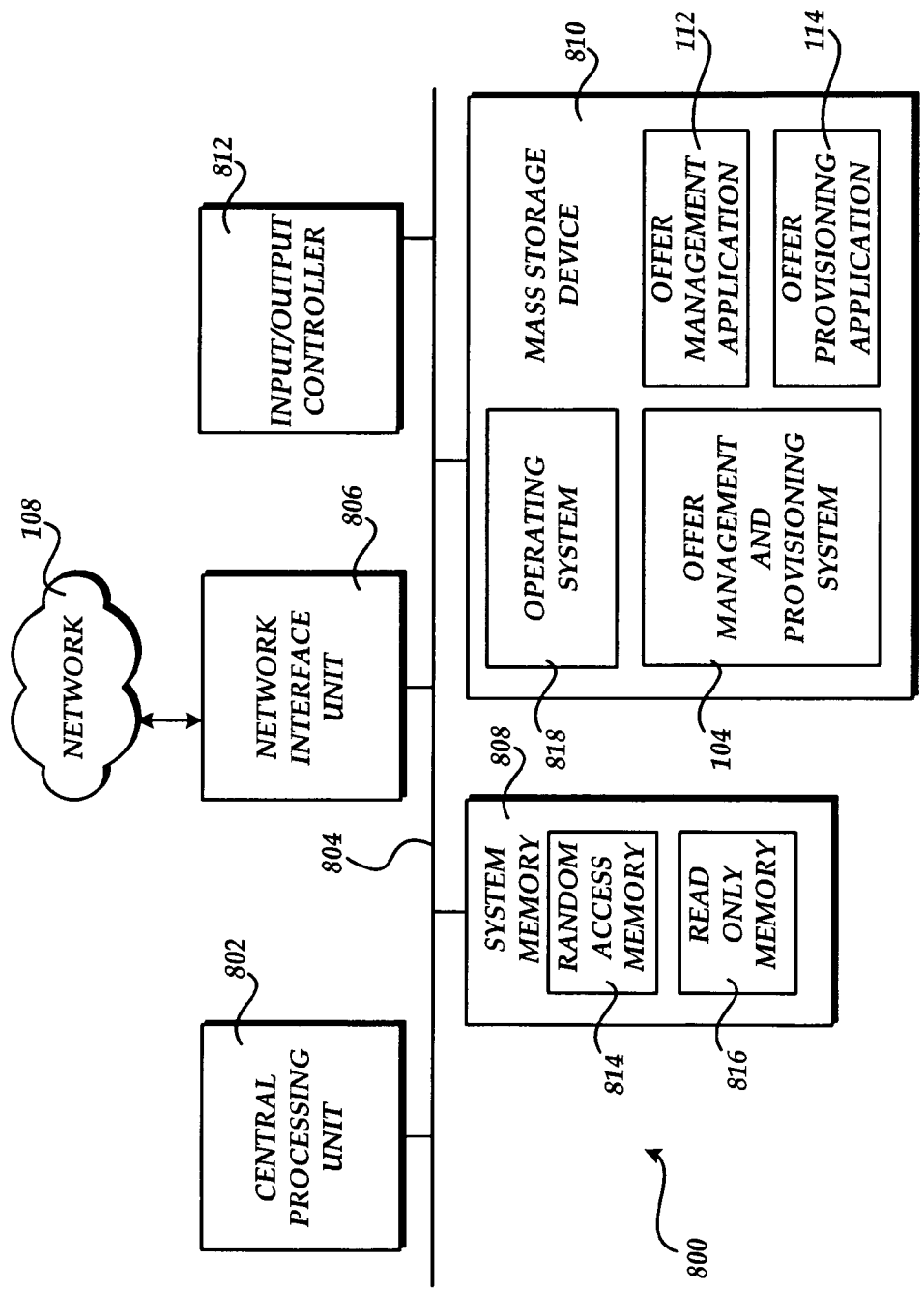
FIG. 8 is a computer architecture diagram showing a computer architecture suitable for implementing the various components and APIs described herein.

Referring now to FIG. 8, an illustrative computer architecture for a computer 800 utilized in the various embodiments presented herein will be discussed. The computer architecture shown in FIG. 8 illustrates a conventional desktop, laptop computer, or server computer. The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which will be described in greater detail below.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network 108, such as the Internet. The computer 800 may connect to the network 108 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that although the embodiments presented herein are described in the context of a desktop or laptop client computer 120, 126 and a remote server computer 102, 110, many other types of computing devices and systems may be utilized to embody the various aspects presented herein.

The mass storage device 810 and RAM 814 may also store one or more program modules. In particular, the mass storage device 810 and the RAM 814 may store the offer management and provisioning system 104, the offer management application 112, the offer provisioning application 114, and the other program modules described above with respect to FIG. 1. Other program modules may also be stored in the mass storage device 810 and utilized by the computer 800.

Based on the foregoing, it should be appreciated that methods and computer-readable media for providing custom APIs for creating, managing, and provisioning packages of online applications are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus for managing packages of online applications comprising:
    a processor; and
    a computer-readable storage media having instructions stored thereupon which, when executed by the processor, cause the apparatus to
        expose an application programming interface (API) for provisioning one or more online applications packaged in an offer for a subscriber,
        receive a call to a method exposed by the API requesting an account be provisioned for the subscriber, the call specifying the offer and properties of the subscriber,
        in response to receiving the call to the method exposed by the API, create an account associated with the subscriber in a subscription store,
        retrieve the one or more online applications packaged in the offer,
        utilize the API to provision each of the one or more online applications packaged in the offer for the account associated with the subscriber, the provisioning of an online application for the account comprising provisioning a new instance of the online application to execute on an application provider server associated with the online application upon a first use by the subscriber, and
        return an identifier for the account.

2. The apparatus of claim 1, wherein the computer-readable storage media has additional computer executable instructions stored thereon which, when executed by the processor, cause the apparatus to:
    receive a call to a method exposed by the API requesting one of the one or more online applications provisioned for an account be re-provisioned, the call specifying the account, the online application, and properties for re-provisioning the online application; and
    in response to receiving the call to the method exposed by the API, cause the online application to be re-provisioned for the account.

3. The apparatus of claim 1, wherein the computer-readable storage media has additional computer executable instructions stored thereon which, when executed by the processor, cause the apparatus to:
    receive a call to a method exposed by the API requesting an account be disabled, the call specifying the account;
    in response to receiving the call to the method exposed by the API, retrieve from the subscription store the online applications provisioned for the account;
    for each of the online applications provisioned for the account, cause the online application to be disabled;
    receive a call to a method exposed by the API requesting the account be re-enabled, the call specifying the account;
    in response to receiving the call to the method exposed by the API, retrieve from the subscription store the online applications provisioned for the account; and
    for each of the online applications provisioned for the account, cause the online application to be enabled.

4. The apparatus of claim 1, wherein the computer-readable storage media has additional computer executable instructions stored thereon which, when executed by the processor, cause the apparatus to:
    receive a call to a method exposed by the API requesting an account be de-provisioned, the call specifying the account;
    in response to receiving the call to the method exposed by the API, retrieve from the subscription store the online applications provisioned for the account;
    for each of the online applications provisioned for the account, cause the online application to be de-provisioned; and
    remove the account from the subscription store.

5. The apparatus of claim 1, wherein the computer-readable storage media has additional computer executable instructions stored thereon which, when executed by the processor, cause the apparatus to:
    receive a call to a method exposed by the API requesting an account be converted to a new account type, the call specifying the account and the properties of the new account type;
    in response to receiving the call to the method exposed by the API, retrieve from the subscription store the online applications provisioned for the account;
    for each of the online applications provisioned for the account, cause the online application to be de-provisioned;
    update the account in the subscription store to reflect the new account type;
    retrieve one or more online applications packaged in an offer associated with the new account type; and
    for each of the one or more online applications, cause the online application to be provisioned for the account.

6. The apparatus of claim 1, wherein accessibility to a method of the API and accessibility to an account in the subscription store is limited based upon an identity of a caller to the API.

7. The apparatus of claim 1, wherein exposing the API further comprises making methods of the API available to callers over an Internet and wherein the method is callable by a personal computer application.

8. A computer-implemented method for provisioning and maintaining instances of online applications provided by application providers utilizing an application provider application programming interface (API), the method comprising:
    publishing a specification of the application provider API for implementation by a plurality of application providers;
    calling a method of the application provider API implemented by one of the plurality of application providers to determine if an instance of an online application can be provisioned by the application provider, the call specifying the online application and properties of the instance of the online application to be provisioned; and
    determining the online application can be provisioned at least by a first use of the online application, calling a method of the application provider API implemented by the application provider to provision an instance of the online application, the call further specifying an identifier for the instance of the online application to be provisioned, the instance of the online application to be executed on an application provider server associated with the online application.

9. The computer-implemented method of claim 8, wherein the call further specifies a base property value and one or more relative property values for at least one of the properties of the instance of the online application to be provisioned.

10. The computer-implemented method of claim 8 further comprising:
   calling a method of the API implemented by the application provider to determine if an instance of the online application can be re-provisioned with new property values, the call specifying the identifier for the instance of the online application and the new property values with which to re-provision the online application; and
   if the instance of the online application can be re-provisioned, calling a method of the API implemented by the application provider to re-provision the instance of the online application with the new property values.

11. The computer-implemented method of claim 8 further comprising:
   calling a method of the API implemented by the application provider to determine if an instance of the online application can be converted to a new online application type, the call specifying the identifier for the instance of the online application; and
   if the instance of the online application can be converted to the new online application type, calling a method of the API implemented by the application provider to convert the instance of the online application to the new online application type.

12. The computer-implemented method of claim 8, further comprising calling a method of the API implemented by the application provider to de-provision an instance of the online application, the call specifying the identifier for the instance of the online application.

13. The computer-implemented method of claim 8 further comprising:
   calling a method of the API implemented by the application provider to retrieve user interface details for an instance of an online application, the call specifying the identifier for the instance of the online application, the user interface details used to display a user interface allowing a user to modify the properties of the online application.

14. An optical disk, magnetic storage device, or solid state storage device encoding a sequence of computer-executable instructions thereupon which, when executed by a processor, cause the processor to:
   expose an application programming interface (API) for provisioning one or more online applications packaged in an offer for a subscriber;
   receive a call to a method exposed by the API requesting an account be provisioned for the subscriber, the call specifying the offer and properties of the subscriber;
   in response to receiving the call to the method exposed by the API, create an account associated with the subscriber in a subscription store;
   retrieve the one or more online applications packaged in the offer;
   utilize the API to provision each of the one or more online applications packaged in the offer for the account associated with the subscriber, the provisioning of an online application for the account comprising provisioning a new instance of the online application to execute on an application provider server associated with the online application upon a first use by the subscriber; and
   return an identifier for the account.

15. The optical disk, magnetic storage device, or solid state storage device of claim 14, comprising further computer-executable instructions which, when executed by the processor, cause the processor to:
   receive a call to a method exposed by the API requesting one of the one or more online applications provisioned for an account be re-provisioned, the call specifying the account, the online application, and properties for re-provisioning the online application; and
   in response to receiving the call to the method exposed by the API, cause the online application to be re-provisioned for the account.

16. The optical disk, magnetic storage device, or solid state storage device of claim 14, comprising further computer-executable instructions which, when executed by the processor, cause the processor to:
   receive a call to a method exposed by the API requesting an account be disabled, the call specifying the account;
   in response to receiving the call to the method exposed by the API, retrieve from the subscription store the online applications provisioned for the account;
   for each of the online applications provisioned for the account, cause the online application to be disabled;
   receive a call to a method exposed by the API requesting the account be re-enabled, the call specifying the account;
   in response to receiving the call to the method exposed by the API, retrieve from the subscription store the online applications provisioned for the account; and
   for each of the online applications provisioned for the account, cause the online application to be enabled.

17. The optical disk, magnetic storage device, or solid state storage device of claim 14, comprising further computer-executable instructions which, when executed by the processor, cause the processor to:
   receive a call to a method exposed by the API requesting an account be de-provisioned, the call specifying the account;
   in response to receiving the call to the method exposed by the API, retrieve from the subscription store the online applications provisioned for the account;
   for each of the online applications provisioned for the account, cause the online application to be de-provisioned; and
   remove the account from the subscription store.

18. The optical disk, magnetic storage device, or solid state storage device of claim 14, comprising further computer-executable instructions which, when executed by the processor, cause the processor to:
   receive a call to a method exposed by the API requesting an account be converted to a new account type, the call specifying the account and the properties of the new account type;
   in response to receiving the call to the method exposed by the API, retrieve from the subscription store the online applications provisioned for the account;
   for each of the online applications provisioned for the account, cause the online application to be de-provisioned;
   update the account in the subscription store to reflect the new account type;
   retrieve one or more online applications packaged in an offer associated with the new account type; and
   for each of the one or more online applications, cause the online application to be provisioned for the account.

19. The optical disk, magnetic storage device, or solid state storage device of claim 14, wherein accessibility to a method of the API and accessibility to an account in the subscription store is limited based upon an identity of a caller to the API.

20. The optical disk, magnetic storage device, or solid state storage device of claim 14, wherein exposing the API further comprises making methods of the API available to callers over an Internet and wherein the method is callable by a personal computer application.

\* \* \* \* \*